No. 792,103. PATENTED JUNE 13, 1905.
G. WINTER & F. EICHBERG.
ALTERNATING CURRENT MOTOR CONTROL.
APPLICATION FILED NOV. 14, 1904.
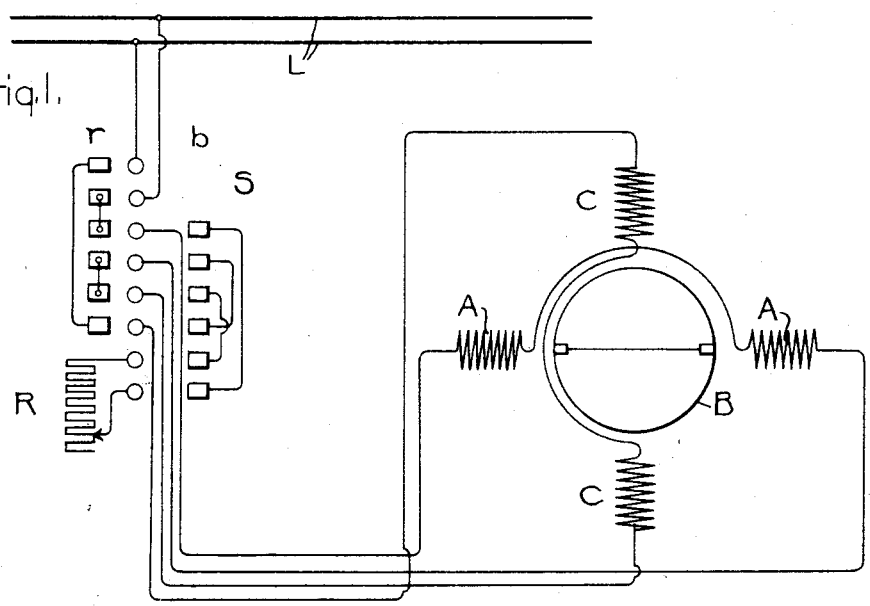
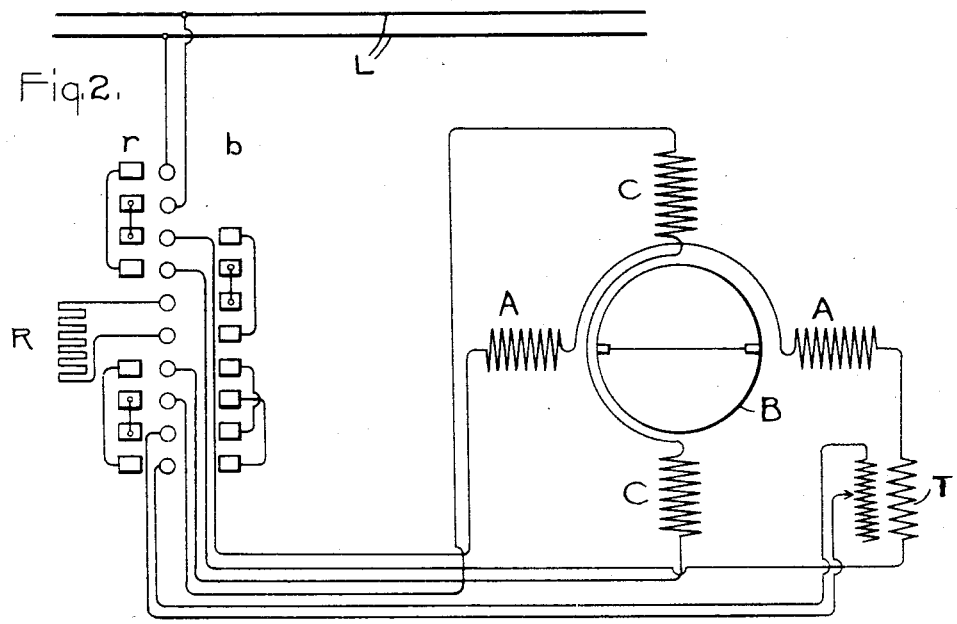
WITNESSES:
INVENTORS:
Gabriel Winter,
Friedrich Eichberg,
by Albert H. Davis Att'y No. 792,103.  Patented June 13, 1905.

UNITED STATES PATENT OFFICE.

GABRIEL WINTER, OF VIENNA, AUSTRIA-HUNGARY, AND FRIEDRICH EICHBERG, OF BERLIN, GERMANY, ASSIGNORS TO GENERAL ELECTRIC COMPANY, A CORPORATION OF NEW YORK.

ALTERNATING-CURRENT-MOTOR CONTROL.

SPECIFICATION forming part of Letters Patent No. 792,103, dated June 13, 1905.

Application filed November 14, 1904. Serial No. 232,609.

*To all whom it may concern:*

Be it known that we, GABRIEL WINTER, residing at Vienna, in the Empire of Austria-Hungary, and FRIEDRICH EICHBERG, residing at Berlin, in the Empire of Germany, both subjects of the Emperor of Austria-Hungary, have invented certain new and useful Improvements in Alternating-Current-Motor Control, of which the following is a specification.

Our invention relates to the control of alternating-current motors of the type disclosed in our former application, Serial No. 146,692, filed by us March 16, 1903; and its object is to provide a simple and efficient means for braking such motors. The type of motor disclosed in the above application comprises three windings. One of these, which may be called the "inducing-winding," is supplied from a source of alternating current. A second winding, which may be called the "induced winding" and which is relatively movable to the first, is short-circuited on the line of magnetization produced by the first winding and has current induced in it by that magnetization. The third winding, which may be called the "exciting-winding," produces a magnetization at an angle to that of the inducing and induced windings, and this magnetization, in combination with the current in the other windings, produces a motor torque. The exciting-winding is connected in series with the induced or inducing windings directly or through a series transfomer. The latter arrangement is preferred, since it enables the torque of the motor to be regulated with ease. Although three windings are mentioned, the exciting-winding, as pointed out in our former application, may be combined with either the inducing or induced winding.

The object of our present invention is to connect the windings of a motor of this type so that a strong braking action is secured when desired.

Our invention consists in reversing the relative connections of the inducing and exciting windings and short-circuiting the inducing-winding on itself. This action causes the motor to act as an efficient brake, and the braking effect may be readily controlled by means of the same series transformer which controls the torque when running.

Our invention will best be understood by reference to the accompanying drawings, in which—

Figure 1 shows diagrammatically a motor of the type above described, in which the exciting-winding is connected directly in series with the inducing-winding, together with a switch for establishing braking connections in accordance with our invention; and Fig. 2 shows a similar arrangement of motor and controlling-switch, but with the exciting-winding connected in series with the inducing-winding through a series transformer with variable ratio.

Referring first to Fig. 1, A A represent the inducing-winding, which in operation is connected to the line-wires L by means of a switch S. B represents the induced winding, which is shown diagrammatically as a rotor-winding provided with commutator-brushes arranged and connected to short-circuit the winding on the line of magnetization produced by the inducing-winding A A. C C represent the exciting-winding, arranged to produce a magnetization at right angles to that of the induced and inducing windings. The winding C is in the arrangement shown connected directly in series with the winding A. The switch S has two positions—for running and for braking, (indicated by the letters $r$ and $b$.) With the switch in the position $r$ it will be seen that the current passes from the upper line-wire through the inducing-winding A A, through the exciting-winding C C, to the lower line-wire. The field produced by the winding C C acting upon the currents in the induced winding B produces the motor torque. Now if switch S is moved to the braking position, as indicated by $b$, the windings A and C are still in series, but are connected to the terminals of the resistance R instead of to the line-wire. This connection, as has been heretofore said, produces a strong and effective braking action, which may be controlled by varying the amount of resistance R in the short circuit.

In the arrangement shown in Fig. 2 the exciting-winding C is not connected directly in series with the inducing-winding A A, but is connected to the secondary of a series transformer T with variable ratio. By means of this transformer the strength of the field produced by the exciting-winding C may be varied and the motor torque thereby regulated. When the switch S is in the braking position, as indicated by b, the connections of the exciting-winding C are reversed relative to the secondary of the transformer T, and consequently relative to the inducing-winding A. The inducing-winding A is short-circuited through the resistances R, as before, with the primary of transformer T in the closed circuit. As before, this connection produces an efficient braking action, which may be regulated in amount by varying the ratio of the series transformer T or by varying the amount of resistance R, as in Fig. 1, or both.

Although for the sake of simplicity the exciting and inducing windings have been shown as independent, it will be understood that the exciting-winding may be combined with either the inducing or induced winding, as fully set forth in our former application, and when the term "exciting-winding" is used in the appended claims it will be understood that it includes any winding to produce a magnetization at an angle to that of the inducing or induced windings whether independent of those windings or combined with one of them. Furthermore, although in Fig. 1 we have shown the resistance connected in series with both windings A and C and in Fig. 2 have shown it connected in series with winding A alone, it is evident that the braking resistance may be placed in series with any of the three windings with the same result in each case, since all three windings are inductively connected in series, as the windings A and B correspond to the primary and secondary of a transformer, while the winding C is connected in series with the winding A or B either directly or through a transformer. Accordingly we do not desire to limit ourselves to the particular construction and arrangement here shown, but aim in the appended claims to cover all modifications which are within the scope of our invention.

What we claim as new, and desire to secure by Letters Patent of the United States, is—

1. In an alternating-current motor, an inducing-winding, an induced winding relatively movable thereto and short-circuited on the line of magnetization produced thereby, an exciting-winding arranged to produce a second magnetization at an angle to the first, and means for reversing the relative connections of said exciting-winding and short-circuiting said inducing-winding.

2. In an alternating-current motor, an inducing-winding, an induced winding relatively movable thereto and short-circuited on the line of magnetization produced thereby, a transformer having its primary in series with one of said windings, an exciting-winding connected to the secondary of said transformer and arranged to produce a magnetization at an angle to the first, and means for reversing the relative connections of said exciting-winding and short-circuiting said inducing-winding.

3. In an alternating-current motor, an inducing-winding, an induced winding relatively movable thereto and short-circuited on the line of magnetization produced thereby, a transformer having its primary in series with one of said windings, an exciting-winding connected to the secondary of said transformer and arranged to produce a magnetization at an angle to the first, means for reversing the relative connections of said exciting-winding and short-circuiting said inducing-winding, and means for varying the ratio of transformation of said transformer.

4. In an alternating-current motor, an inducing-winding, an induced winding relatively movable thereto and short-circuited on the line of magnetization produced thereby, a transformer having its primary in series with one of said windings, an exciting-winding connected to the secondary of said transformer and arranged to produce a magnetization at an angle to the first, and a switch adapted and arranged to connect said inducing-winding to a source of alternating current or in short-circuit and to reverse the relative connections of said exciting-winding.

5. In an alternating-current motor, an inducing-winding, an induced winding relatively movable thereto and short-circuited on the line of magnetization produced thereby, an exciting-winding arranged to produce a second magnetization at an angle to the first, and means for reversing the relative connections of said exciting-winding and short-circuiting said inducing-winding through a variable resistance.

6. In an alternating-current motor, an inducing-winding, an induced winding relatively movable thereto and short-circuited on the line of magnetization produced thereby, a transformer having its primary in series with one of said windings, an exciting-winding connected to the secondary of said transformer and arranged to produce a magnetization at an angle to the first, and means for reversing the relative connections of said exciting-winding and short-circuiting said inducing-winding through a resistance.

7. In an alternating-current motor, an inducing-winding, an induced winding relatively movable thereto and short-circuited on the line of magnetization produced thereby, an exciting-winding arranged to produce a second magnetization at an angle to the first, means for reversing the relative connections of said exciting-winding and short-circuiting said inducing-winding, and means for connecting a resistance in series with one of said windings.

8. In an alternating-current motor, an inducing-winding, an induced winding relatively movable thereto and short-circuited on the line of magnetization produced thereby, a transformer having its primary in series with one of said windings, an exciting-winding connected to the secondary of said transformer and arranged to produce a magnetization at an angle to the first, means for reversing the relative connections of said exciting-winding and short-circuiting said inducing-winding, and means for connecting a resistance in series with one of said windings.

In witness whereof we have hereunto set our hands this 18th day of October, 1904.

GABRIEL WINTER.
FRIEDRICH EICHBERG.

Witnesses as to Gabriel Winter:
   ALVESTO S. HOGUE,
   AUGUST FUGGER.

Witnesses as to Friedrich Eichberg:
   HENRY HASPER,
   WOLDEMAR HAUPT.